United States Patent
Lee et al.

(10) Patent No.: US 8,666,126 B2
(45) Date of Patent: Mar. 4, 2014

(54) FINGERPRINT DETECTION SENSOR AND METHOD OF DETECTING FINGERPRINT

(75) Inventors: Seung Seoup Lee, Gyunggi-do (KR); Il Kwon Chung, Gyunggi-do (KR); Jae Hyouck Choi, Gyunggi-do (KR); Jun Kyung Na, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 33 days.

(21) Appl. No.: 13/440,205

(22) Filed: Apr. 5, 2012

(65) Prior Publication Data

US 2013/0136321 A1 May 30, 2013

(30) Foreign Application Priority Data

Nov. 30, 2011 (KR) .................. 10-2011-0127167

(51) Int. Cl.
*G06K 9/00* (2006.01)
(52) U.S. Cl.
USPC .......................................... 382/124
(58) Field of Classification Search
None
See application file for complete search history.

(56) References Cited

U.S. PATENT DOCUMENTS

| | | | |
|---|---|---|---|
| 6,812,621 B2 | 11/2004 | Scott | |
| 7,489,066 B2 | 2/2009 | Scott et al. | |
| 7,708,695 B2 | 5/2010 | Akkermans et al. | |
| 7,778,683 B2 | 8/2010 | Nakamura et al. | |
| 2005/0105784 A1 | 5/2005 | Nam | |
| 2008/0152195 A1* | 6/2008 | Nagasaka et al. | 382/115 |
| 2010/0008546 A1* | 1/2010 | Abe | 382/115 |
| 2010/0239133 A1* | 9/2010 | Schmitt et al. | 382/124 |
| 2012/0059237 A1* | 3/2012 | Amir et al. | 600/365 |
| 2012/0070043 A1* | 3/2012 | Higuchi | 382/124 |

FOREIGN PATENT DOCUMENTS

| | | |
|---|---|---|
| JP | 2006-212269 | 8/2006 |
| KR | 10-2005-0047921 | 5/2005 |
| KR | 10-0887275 | 4/2008 |
| WO | WO 01/71648 A2 | 9/2001 |

OTHER PUBLICATIONS

Korean Office Action issued on Jan. 14, 2013 in corresponding Korean Patent Application No. 10-2011-0127167.

* cited by examiner

*Primary Examiner* — Atiba O Fitzpatrick
*Assistant Examiner* — Thomas A James

(57) ABSTRACT

There is provided a fingerprint detection sensor and a method of detecting a fingerprint. The fingerprint detection sensor according to embodiments of the present invention includes a plurality of piezoelectric sensors arranged on a two-dimensional plane; and a fingerprint detection unit detecting a fingerprint by using ultrasonic signals discharged from the plurality of respective piezoelectric sensors, wherein the fingerprint detection unit determines whether the fingerprint is a forged fingerprint by detecting bloodstreams within a first region on the two-dimensional plane in which the ultrasonic signals discharged from the plurality of respective piezoelectric sensors overlap one another.

9 Claims, 4 Drawing Sheets

FINGERPRINT DETECTION SENSOR AND METHOD OF DETECTING FINGERPRINT

CROSS-REFERENCE TO RELATED APPLICATIONS

This application claims the priority of Korean Patent Application No. 10-2011-0127167 filed on Nov. 30, 2011, in the Korean Intellectual Property Office, the disclosure of which is incorporated herein by reference.

BACKGROUND OF THE INVENTION

1. Field of the Invention

The present invention relates to a sensor and a method of detecting a fingerprint capable of differentiating a forged fingerprint by detecting blood streams within an object in contact therewith using overlapping ultrasonic signals in a region in which the ultrasonic signals emitted through a plurality of piezoelectric sensors have relatively high intensity due to the overlap thereof.

2. Description of the Related Art

A fingerprint detection sensor, a sensor for detecting a human fingerprint, has been used in apparatuses such as an existing door lock, or the like, and has also been widely used to determine whether a power supply of an electronic device is turned on or off or whether a sleep mode thereof has been released. In particular, unlike the type of fingerprint detection sensor generally used for the door lock, a swipe type finger detection sensor capable of being configured to have a small volume has recently been developed, and thus, the fingerprint detection sensor is prevalently being used in mobile devices.

Fingerprint detection sensors may be classified into an ultrasonic type, an infrared type, a capacitive type, or the like, according to an operational principle thereof. Among these, the ultrasonic type fingerprint detection sensor is a type of fingerprint detection sensor detecting a fingerprint by measuring a difference in acoustic impedance between each valley and each ridge of the fingerprint by using an ultrasonic wave generation source, that is, a plurality of corresponding piezoelectric sensors, when the ultrasonic signals of a predetermined frequency discharged from the plurality of piezoelectric sensors are reflected from the valleys and ridges of the fingerprint. In particular, the ultrasonic type fingerprint detection sensor may be advantageous in that it has a function of detecting blood streams in fingers by generating pulse-type ultrasonic waves and detecting a Doppler effect due to the reverberation of the pulse-type ultrasonic waves, in addition to a function of simply detecting a fingerprint and thus, may determine whether the fingerprint has been forged by using the function.

Considering the fact that most blood stream flowing in the fingers are blood streams flowing along capillary vessels, very high intensity ultrasonic signals need to be generated to detect the blood stream by using the Doppler effect. To this end, the related art intentionally applies a phase delay to a plurality of ultrasonic signal generation units that generate and discharge the ultrasonic signals or applies a beam forming scheme thereto. However, in the case of the application of the phase delay or the beam forming scheme, circuit complexity, as well as an overall size are increased to degrade price competitiveness and cause problems in the miniaturization of fingerprint detection sensors, thereby leading to limitations in applicability.

SUMMARY OF THE INVENTION

An aspect of the present invention provides a fingerprint detection sensor including a plurality of piezoelectric sensors, capable of detecting blood streams by arranging a plurality of piezoelectric sensor on a two-dimensional plane in a matrix form and using ultrasonic signals reflected from an object in a first region in which the ultrasonic signals discharged from respective piezoelectric sensors overlap.

Another aspect of the present invention provides a fingerprint detection sensor capable of determining a living body by using a simple structure without an additional circuit.

According to an aspect of the present invention, there is provided a fingerprint detection sensor, including: a plurality of piezoelectric sensors arranged on a two-dimensional plane; and a fingerprint detection unit detecting a fingerprint by using ultrasonic signals discharged from the plurality of respective piezoelectric sensors, wherein the fingerprint detection unit determines whether the fingerprint is a forged fingerprint by detecting blood streams within a first region on the two-dimensional plane in which the ultrasonic signals discharged from the plurality of respective piezoelectric sensors overlap one another.

The first region may be a region having a predetermined area based on a central point of the two-dimensional plane.

The fingerprint detection unit may determine whether the fingerprint is a forged fingerprint by detecting blood streams within a second region having an area larger than that of the first region, when the fingerprint detection unit fails to determine whether the fingerprint is the forged fingerprint within the first region.

The fingerprint detection unit may detect the fingerprint based on a difference in acoustic impedance generated by the ultrasonic signals discharged from the plurality of respective piezoelectric sensors.

The fingerprint detection unit may the fingerprint based on a difference between first acoustic impedance corresponding to valleys of the fingerprint and second acoustic impedance corresponding to ridges of the fingerprint.

The fingerprint detection sensor may further include a polymer filler provided to surround the plurality of piezoelectric sensors.

The fingerprint detection unit may detect a frequency change generated from the ultrasonic signals within the first region by the blood streams to determine whether the fingerprint is a forged fingerprint.

The fingerprint detection sensor may further include a blood sugar detection unit measuring a blood sugar level based on a velocity of the blood streams.

According to another aspect of the present invention, there is provided a method of detecting a fingerprint, the method including: discharging ultrasonic signals to a specific object from a plurality of piezoelectric sensors arranged on a two-dimensional plane in a matrix form; detecting reflected signals generated by reflecting the ultrasonic signals to the object within a first region on the two-dimensional plane in which the ultrasonic signals overlap one another; and determining whether the object is a living body by using a difference in frequency between the ultrasonic signals and the reflected signals.

The determining whether the object is a living body may be performed by using the difference in frequency generated by blood streams within the object between the ultrasonic signals and the reflected signals.

The method may further include detecting the reflected signals within a second region having an area larger than that of the first region when it fails to determine whether the object is a living body.

The method may further include detecting a fingerprint of the object.

In the detecting of the fingerprint, the fingerprint may be detected based on a difference between first acoustic impedance corresponding to valleys of the fingerprint and second acoustic impedance corresponding to ridges of the fingerprint.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
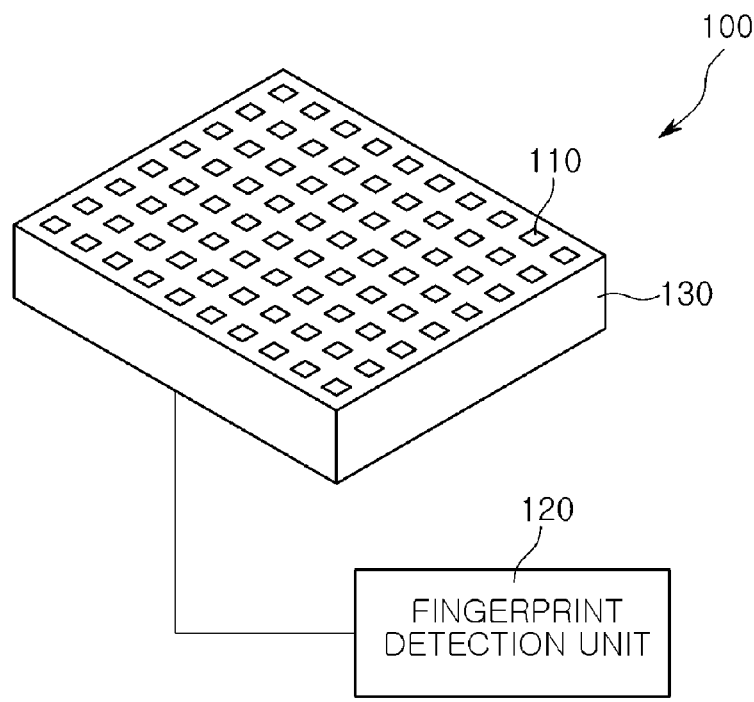
FIG. 1 is a view illustrating a fingerprint detection sensor according to an embodiment of the present invention.

A detailed description of the present invention to be described below refers to the accompanying drawings shown as a predetermined embodiment that can implement the present invention as an example. The embodiments are described in detail so that those skilled in the art can implement the present invention sufficiently. It should be appreciated that various embodiments of the present invention are different from each other, but the embodiments do not need to be exclusive to each other. For example, specific shapes, configurations, and characteristics described in an embodiment of the present invention may be implemented in another embodiment without departing from the spirit and the scope of the present invention. In addition, it should be understood that position and arrangement of individual components in each disclosed embodiment may be changed without departing from the spirit and the scope of the present invention. Therefore, a detailed description described below should not be construed as being restrictive. In addition, the scope of the present invention is defined only by the accompanying claims and their equivalents if appropriate. The similar reference numerals will be used to describe the same or similar functions throughout the accompanying drawing.

Hereinafter, embodiments of the present invention will be described in detail with reference to the accompanying drawings so that those skilled in the art may easily practice the present invention.

FIG. 1 is a view illustrating a fingerprint detection sensor according to an embodiment of the present invention.

Referring to FIG. 1, a fingerprint detection sensor 100 according to an embodiment of the present invention may include a plurality of piezoelectric sensors 110, a fingerprint detection unit 120 electrically connected with the plurality of piezoelectric sensors 110 to detect a fingerprint, and a polymer filler 130 provided to surround the plurality of piezoelectric sensors 110. The plurality of piezoelectric sensors 110 and the polymer filler 130 may be arranged to form an array in a matrix form on a two-dimensional plane.

The fingerprint detection unit 120 may be connected to each of the plurality of piezoelectric sensors 110, in particular, may be connected to electrodes disposed on the top and bottom of each piezoelectric sensor 10 in a height direction thereof. Each piezoelectric sensor 110 may be a 1-3 piezo composite and may be manufactured by disposing electrodes on top and bottom surfaces of a pillar extending in a height direction. The pillar may be made of at least one of PZT, PST, Quartz, $(Pb, Sm)TiO_3$, $PMN(Pb(MgNb)O_3)$—$PT(PbTiO_3)$, PVDF, and PVDF-TrFe.

The fingerprint detection unit 120 may apply voltage having a resonance frequency in an ultrasonic band to the electrodes disposed on top and bottom surfaces of the pillars to vertically vibrate the pillars, thereby generating ultrasonic signals. The top and bottom surfaces of each piezoelectric sensor 110, each may be a square or circle having a side or diameter of 40 to 50 μm.

The polymer filler 130 provided to surround the plurality of piezoelectric sensors 110 may prevent vibrations of the plurality of respective piezoelectric sensors 110 from affecting one another. An array structure including the plurality of piezoelectric sensors 110 is manufactured by densely arranging the plurality of piezoelectric sensors 110, each having the pillar shape and forming the polymer filler 130 to surround the piezoelectric sensors 110. Therefore, as a larger number of piezoelectric sensors 110 are arranged within the same area, difficulty in a manufacturing process may be increased, thereby causing degradation in yield, or the like. However, since the fingerprint may be accurately detected by measuring a difference in acoustic impedance generated in valleys and ridges of the fingerprint by the ultrasonic signals discharged from the respective piezoelectric sensors 110, a possible large number of the piezoelectric sensors 110 need to be arranged within the same area so as to accurately detect the fingerprint.

Figure 2:
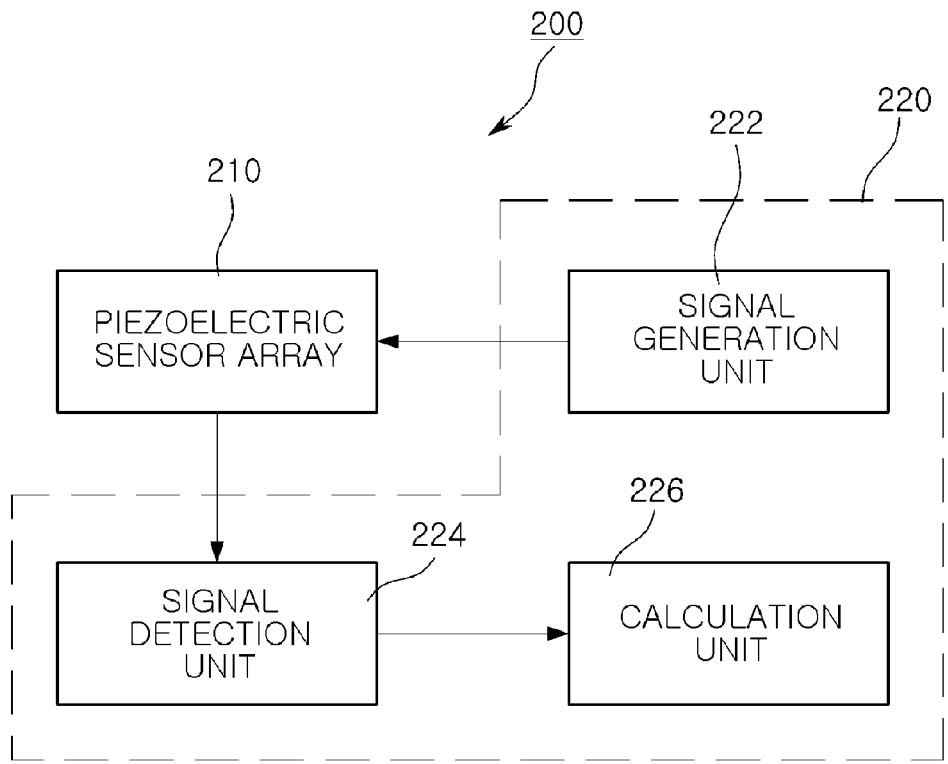
FIG. 2 is a block view schematically illustrating a fingerprint detection sensor according to another embodiment of the present invention.

FIG. 2 is a block view schematically illustrating a fingerprint detection sensor according to another embodiment of the present invention.

Referring to FIG. 2, a fingerprint detection sensor 200 according to another embodiment of the present invention may include a piezoelectric sensor array 210 including the plurality of piezoelectric sensors 110 and the polymer filler 130 and a fingerprint detection unit 220. The fingerprint detection unit 220 may include a signal generation unit 220, a signal detection unit 224, a calculation unit 226, or the like.

The piezoelectric sensor array 210 may include the plurality of piezoelectric sensors 110 that are densely arranged in a matrix form and the polymer filler 130 that is provided to surround the plurality of piezoelectric sensors 110 to isolate the vibrations between the respective piezoelectric sensors 110, as shown in FIG. 1. Each of the piezoelectric sensors 110 may include a pillar made of a material facilitating vibrations and electrodes disposed on the top and bottom surfaces of the pillar and made of a conductive material. As described above, the pillar may be made of a material such as PZT and the electrodes may be made of a metal (Cu, Ag, Ni, Mo, an alloy thereof, or the like) having excellent conductivity.

The signal generation unit 222 may be electrically connected with the electrodes of the piezoelectric sensors 110 included in the piezoelectric sensor array 210 and apply alternating current (AC) voltage having a predetermined frequency to the respective electrodes. The ultrasonic signals having a predetermined resonance frequency (ex>10 MHz) are discharged to the outside while the pillars of the piezoelectric sensors 110 are vertically vibrated by the AC voltage applied to the electrodes.

A predetermined protective layer may be additionally disposed on the piezoelectric sensor array 210 and a specific object may contact a surface of the protective layer. When the object contacting the surface of the protective layer is a human finger including a fingerprint, reflection patterns of the ultrasonic signals discharged by the piezoelectric sensor 110 may be differently determined according to fine valleys and ridges of the fingerprint.

Provided that no object contacts a contact surface such as the surface of the protective layer, most ultrasonic signals discharged from the piezoelectric sensors 110 are reflected and returned without passing through the contact surface due to a difference in a medium between the contact surface and air. Conversely, when a specific object including the fingerprint contacts the contact surface, a certain amount of the ultrasonic signals discharged from the piezoelectric sensors 110 directly contacting the ridges of the fingerprint may pass through an interface between the contact surface and the fingerprint and the remainder of the generated ultrasonic signals may be reflected and returned. The intensity of the reflected and returned ultrasonic signals may be determined according to acoustic impedance of each material. Consequently, the signal detection unit 224 may measure a difference in acoustic impedance generated by the ultrasonic signals in the valleys and the ridges of the fingerprint through the respective piezoelectric sensors 110, to determine whether the corresponding piezoelectric sensors 110 are sensors contacting the ridges of the fingerprint.

The calculation unit 226 may analyze the signals detected by the signal detection unit 224 to calculate fingerprint patterns. As described above, the piezoelectric sensors 110, of which reflected signals have a low intensity, may be the piezoelectric sensors 110 contacting the ridges of the fingerprint, while the piezoelectric sensors 110, of which reflected signals have a high intensity, which ideally have an intensity almost equal to the intensity of output ultrasonic signals, may be the piezoelectric sensors 110 corresponding to the valleys of the fingerprint. Therefore, the fingerprint patterns may be calculated from the difference in acoustic impedance detected by the respective piezoelectric sensor 110.

Figure 3:
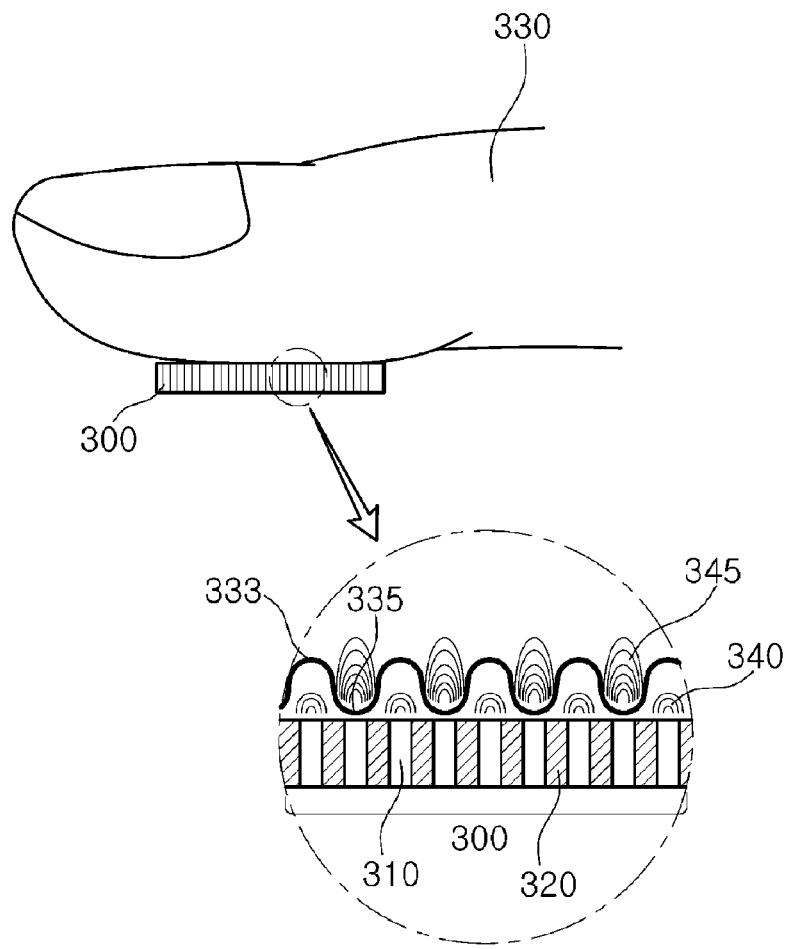
FIGS. 3, 4A-4B, and 5A-5B are views, each for explaining an operation principle of a fingerprint detection sensor according to another embodiment of the present invention.

FIGS. 3 to 5 are view, each for explaining an operation principle of a fingerprint detection sensor according to another embodiment of the present invention.

Referring to FIG. 3, an object such as a finger 330, or the like, contacts on a fingerprint detection sensor 300. In a circular portion showing a partially enlarged cross-sectional view of the fingerprint detection sensor 300, the fingerprint detection sensor 300 may be formed by alternately arranging piezoelectric sensors 310 and a polymer filler 320, and ultrasonic signals having a predetermined frequency may be discharged to the finger 330 through first surfaces of the piezoelectric sensors 310.

Provided that the finger 330 is in non-contact with the finger detection sensor 300, most ultrasonic signals discharged from the piezoelectric sensors 310 do not pass through an interface between the piezoelectric sensors 310 and air and may be returned to the piezoelectric sensors 310, due to a difference in acoustic impedance between the piezoelectric sensors 310 discharging the ultrasonic signals and air. On the other hand, when the finger 330 is in contact with the finger detection sensor 300, a certain amount of the ultrasonic signals discharged from the piezoelectric sensors 310 may penetrate an interface between a skin of the finger 330 and the piezoelectric sensors 310 to be introduced into the finger 330. Therefore, the intensity of the returned and reflected signals becomes low, thereby enabling fingerprint patterns to be detected.

It may be difficult to distinguish the detected fingerprint patterns with the naked eye. However, the fingerprint of the finger 330 has patterns in which a large number of valleys 333 and ridges 335 are repeated and have differences in height. Therefore, as shown in the enlarged cross-sectional view of FIG. 3, the piezoelectric sensors 310 do not directly contact the skin in the valleys 333 of the fingerprint, the piezoelectric sensors 310 only directly contact the skin of the ridges 335 of the fingerprints.

As a result, an extremely small amount of ultrasonic signals 340 discharged from the piezoelectric sensors 310 corresponding to the valleys 333 of the fingerprint may be discharged to the outside and most of the ultrasonic signals 340 may be reflected into the piezoelectric sensors 310. A considerable amount of ultrasonic signals 345 discharged from the piezoelectric sensors 310 corresponding to the ridges 335 of the fingerprint may penetrate the interface between the finger 330 and the piezoelectric sensors 310 to be introduced into the finger 330, such that the intensity of reflected ultrasonic signals may be relatively largely reduced. Therefore, the fingerprint patterns of the finger 330 may be detected by measuring the intensity or reflection coefficient of the reflected signals generated through the reflection and return of the ultrasonic signals 340 and 345 caused by the difference in acoustic impedance according to the valleys 330 and the ridges 335 of the fingerprint, through the respective piezoelectric sensors 310.

Figures 4A, 4B:
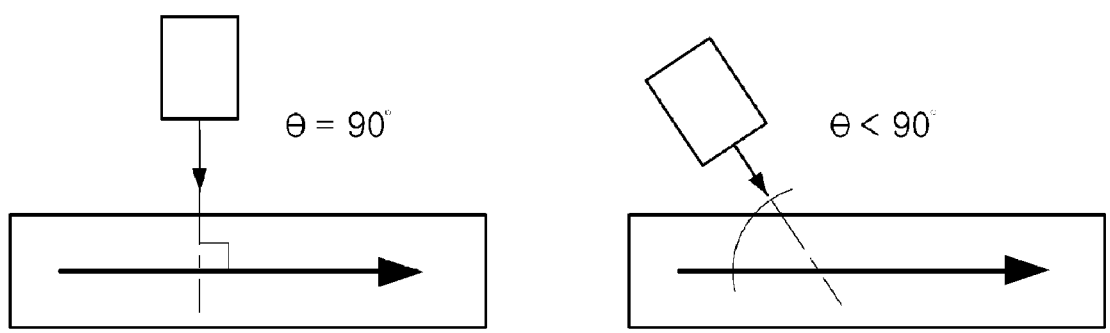

FIGS. 4A and 4B are views, each illustrating a method of detecting a fluid flow by using an ultrasonic signal. The ultrasonic signals 345 discharged from the piezoelectric sensors 310 corresponding to the ridges 335 of the fingerprint of the finger 330 may penetrate the interface between the finger 330 and the piezoelectric sensors 310 to be introduced into the finger 330, such that blood (blood streams) flowing through a capillary vessel, or the like, within the finger 330 may be detected. However, as shown in FIGS. 5A and 5B, due to a use of the Doppler effect, when an incident angle at which the ultrasonic signals are incident on the capillary vessel is 90°, the blood streams may not be detected and when the incident angle is smaller than 90°, the blood streams may be detected by using the Doppler effect.

However, the fingerprint is formed on a tip of the finger 330. Therefore, blood vessels within the finger 330 in contact with the fingerprint detection sensor 300 may be capillary vessels and there may be no thick blood vessels in which a velocity of blood streams is rapid, such as an artery or a vein. Therefore, when the intensity of the ultrasonic signals 345 discharged from the piezoelectric sensor 310 to penetrate into the finger 330 is insufficient, the ultrasonic signals 345 do not reach the capillary vessel, or even though the ultrasonic signals 345 reach the capillary vessel, the intensity of the signal is insufficient and thus, blood slowly flowing in the capillary vessel may not be detected.

Therefore, in order to determine whether the contacted finger 330 is a living body or not by detecting the blood flowing in the capillary vessel in the finger, there is a need to generate ultrasonic signals reaching the capillary vessel and having intensity enough to detect the blood flowing through the capillary vessel. To this end, in the related art, a beam forming or phase delay method is used. However, when the beam forming or phase delay method is used, hardware complexity is increased and a competitive price may be degraded due to an additional module. In particular, when the phase delay method is used, circuit complexity may be greatly increased so as to discharge signals having different phases in each piezoelectric sensor 310. Hereinafter, a method of the embodiment of the present invention for solving the above-mentioned problems will be described with reference to FIG. 5.

Figure 5A:
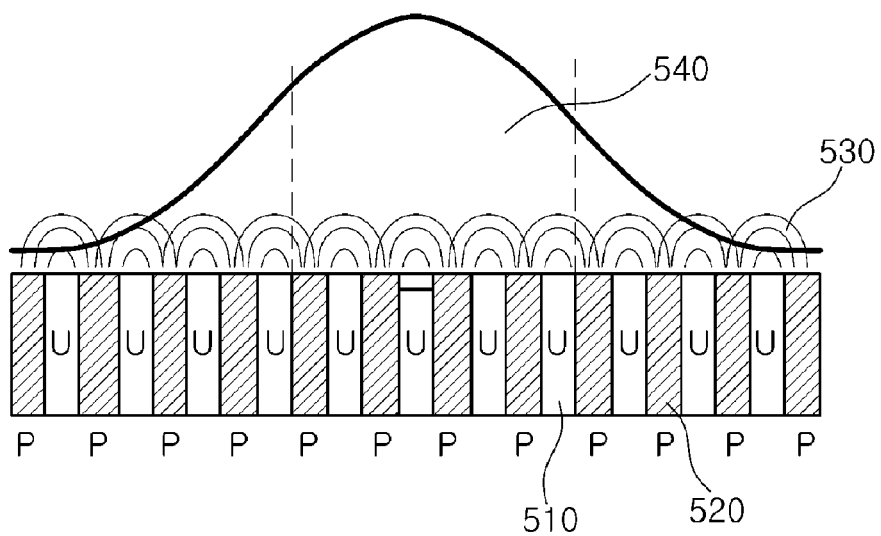
Figure 5B:
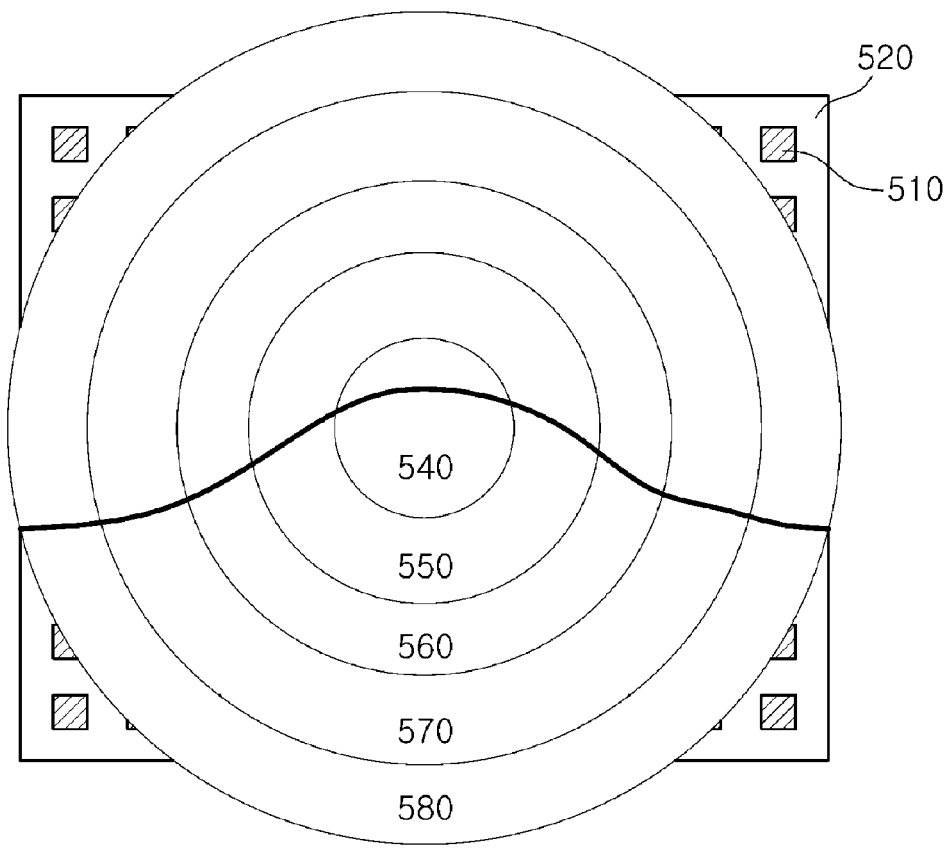

FIGS. 5A and 5B are views, each for explaining an operation principle of the fingerprint detection sensor according to the embodiment of the present invention.

Referring to FIG. 5A, a cross section of the piezoelectric sensor array included in a fingerprint detection sensor is shown. The piezoelectric sensor array includes piezoelectric sensors 510 and a polymer filler 520 that are alternately arranged, wherein the respective piezoelectric sensors 510 discharge ultrasonic signals having a predetermined frequency. As described above, most ultrasonic signals discharged from the piezoelectric sensors 510 corresponding to valleys of a fingerprint are reflected and returned without passing through an interface between the piezoelectric sensors 510 and air. On the other hand, the ultrasonic signals discharged from the piezoelectric sensors 510 corresponding to ridges of the fingerprint may pass through an interface between the piezoelectric sensors 510 and the ridges of the fingerprint to be introduced into the body.

When each of the piezoelectric sensors 510 has a square pillar shape, top and bottom surfaces of each piezoelectric sensor 510, each may be a square having a side of 40 to 50 μm. Since the piezoelectric sensors 510 each having a small cross sectional area and the polymer filler 520 are alternately arranged, the ultrasonic signals discharged from the respective piezoelectric sensor 510 overlap one another. In particular, a large amount of ultrasonic signals discharged from the piezoelectric sensors 510 may overlap one another and thereby have a high intensity, as being closer to a central region 540 on a two-dimensional plane of the piezoelectric sensor array.

As shown in FIG. 5A, a large amount of ultrasonic signals overlap one another in the central region 540, rather than in edges and thus, the ultrasonic signals may have a high intensity therein.

FIG. 5B is a view illustrating intensity distribution of the ultrasonic signals shown on the two-dimensional plane of the piezoelectric sensor array. The plurality of piezoelectric sensors 510 are arranged on the two-dimensional plane and the polymer filler 520 is provided to surround the piezoelectric sensors 510. As shown in FIG. 5A, the largest amount of ultrasonic signals overlap in the central region 540 on the two-dimensional plane of the piezoelectric sensor array and thus, the ultrasonic signals may have a high intensity therein, while ultrasonic signals having a low intensity may be detected as being closer to the edges. Hereinafter, for convenience of explanation, first to fifth regions 540 to 580 are defined in order from the center of the two-dimensional plane toward the edges.

The fingerprint detection unit discharges the ultrasonic signals through the plurality of piezoelectric sensors 510 and detects the fingerprint patterns according to the valleys and the ridges of the fingerprint by using reflected signals detected by the respective piezoelectric sensors 510. Simultaneously therewith, the fingerprint detection unit may determine whether blood streams are present in the object in contact therewith by comparing a frequency of the reflected signals detected by the piezoelectric sensors 510 included within the first region 540 with a frequency of the ultrasonic signals discharged from the piezoelectric sensors 510.

However, a thickness of a capillary vessel may be merely several to several tens of micrometers. Therefore, the capillary vessel in the finger may not be necessarily arranged within the first region 540. Therefore, when the blood streams are not detected by the piezoelectric sensor 510 included within the first region 540, the fingerprint detection unit does not directly determine that an object in contact therewith is not a living body, and may expand a range of detecting the blood streams in order of the second region 550, the third region 560, the fourth region 570, and the fifth region 580. When the blood streams are not detected even in the fifth region 580, the fingerprint detection unit may determine that the object currently in contact therewith is not a living body.

Meanwhile, the fingerprint detection sensor according to the embodiment of the present invention may further include a blood sugar detection unit (not shown) that measures a blood sugar level based on a velocity of the blood streams. The blood sugar level may be determined according to an amount of sugar contained in blood, and a health state of a person whose corresponding fingerprint comes into contact with the fingerprint detection unit, in particular, whether the person suffers from diabetes or the like, may be checked by measuring the blood sugar level. As more sugar is contained in blood, that is, the blood sugar level is increased, the viscosity of blood may be increased and the velocity of blood streams may be generally reduced. Therefore, a relationship between the velocity of blood streams and the blood sugar level is stored on a predetermined memory in the form of a data table, or the like, and a measured velocity of blood streams may be searched from the corresponding data table to measure the blood sugar level. Then, it is possible to inform a health state of a user by informing the user of the detected results by video, audio, or the like.

Figure 6:
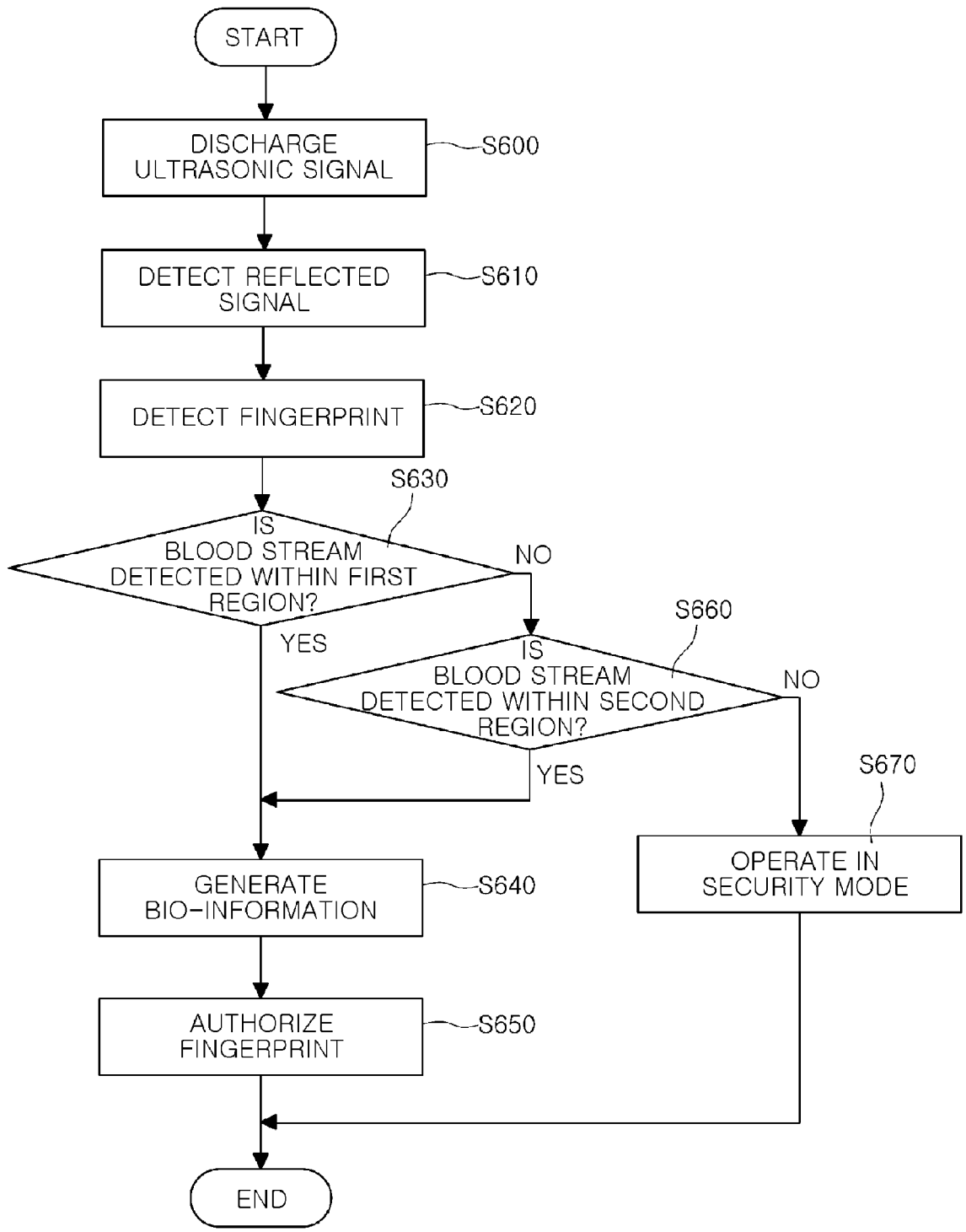
FIG. 6 is a flow chart for explaining a method of detecting a fingerprint according to an embodiment of the present invention.

FIG. 6 is a flow chart for explaining a method of detecting a fingerprint according to an embodiment of the present invention.

Referring to FIG. 6, in a method of detecting a fingerprint according to the embodiment of the present invention, first, the ultrasonic signals may be discharged from the plurality of piezoelectric sensors 510 (S600). The fingerprint detection unit applies voltage having a predetermined frequency to electrodes on the top and bottom surfaces of the piezoelectric sensors 510 each having a pillar shape to vertically vibrate the pillars having vibration characteristics, thereby discharging the ultrasonic signals having a predetermined frequency.

The fingerprint detection unit detects the reflected signals generated by reflecting and returning the ultrasonic signals discharged at S600 from the fingerprints (S610). As described above, most ultrasonic signals discharged from the piezoelectric sensors 510 corresponding to the valleys of the fingerprint are reflected and returned without passing through the interface between the piezoelectric sensors 510 and air. On the other hand, the ultrasonic signals discharged from the piezoelectric sensors 510 corresponding to the ridges of the fingerprint may pass through the interface between the piezoelectric sensors 510 and the skin of the finger to be introduced into the finger. Therefore, in the case in which the intensity of the detected reflected signals is high, it may be determined that the case corresponds to the valleys of the fingerprint. On the other, in the case in which the intensity of the detected reflected signals is low, it may be determined that the case corresponds to the ridges of the fingerprint. The fingerprint detection unit detects the fingerprint patterns by using the detected reflected signals (S620).

When the fingerprint patterns are detected, the fingerprint detection unit detects the blood streams within the first region 540 so as to determine whether the detected fingerprint is a fingerprint of an actual living body (S630). The fingerprint detection unit may detect the blood streams by using the Doppler effect and may detect the blood streams within the first region 540 corresponding to the center of the piezoelectric sensor array, in which a greatest amount of ultrasonic signals overlap and thus, have the highest intensity. When the blood streams are detected within the first region, the fingerprint detection unit generates bio-information (S640) and authorizes the fingerprint by determining whether the fingerprint in contact therewith coincides with fingerprints of previously registered users (S650).

On the other hand, as the determination result of S630, when the blood streams are not detected within the first region 540, the fingerprint detection unit determines whether the blood streams are detected within the second region 550 having an area larger than that of the first region 540 (S660). When the blood streams are detected within the second region 550, the bio-information is generated (S640) and the fingerprint is authorized (S650). On the other hand, when the blood streams are not detected, even within the second region 550, the fingerprint detection unit determines that the finger print currently in contact therewith is not a fingerprint of a living body, terminates the authorization procedure, and operates in a security mode (S670). However, in order to accurately determine whether the fingerprint currently in contact therewith is a fingerprint of a living body, when the blood streams are not detected within the second region 550, the fingerprint detection unit may determine whether the blood streams are detected sequentially within the third, fourth, and fifth regions 560, 570, and 580.

As set forth above, according to the embodiments of the present invention, the fingerprint can be detected by discharging the ultrasonic signals from the plurality of piezoelectric sensors arranged in a matrix form on the two-dimensional plane and then detecting the reflected signals generated when the discharged ultrasonic signals are introduced into objects having different acoustic impedance. In addition, according to the embodiments of the present invention, the fingerprint detection sensor capable of detecting the bio-information, simultaneously with detecting the fingerprint without a separate component by detecting the blood streams using the reflected signals within the first region on the two-dimensional plane, in which the discharged ultrasonic signals overlap one another and thus, have a relatively high intensity.

While the present invention has been shown and described in connection with the embodiments, it will be apparent to those skilled in the art that modifications and variations can be made without departing from the spirit and scope of the invention as defined by the appended claims.

What is claimed is:

1. A fingerprint detection sensor, comprising:
   a plurality of piezoelectric sensors arranged on a two-dimensional plane; and
   a fingerprint detection unit detecting a fingerprint by using ultrasonic signals discharged from the plurality of respective piezoelectric sensors,
   wherein the fingerprint detection unit determines whether the fingerprint is a forged fingerprint by detecting blood streams within a first region on the two-dimensional plane in which the ultrasonic signals discharged from the plurality of respective piezoelectric sensors overlap one another, and
   wherein the fingerprint detection unit determines whether the fingerprint is a forged fingerprint by detecting blood streams within a second region having an area larger than that of the first region, when the fingerprint detection unit fails to determine whether the fingerprint is the forged fingerprint within the first region.

2. The fingerprint detection sensor of claim 1, wherein the first region is a region having a predetermined area based on a central point of the two-dimensional plane.

3. The fingerprint detection sensor of claim 1, wherein the fingerprint detection unit detects the fingerprint based on a difference in acoustic impedance generated by the ultrasonic signals discharged from the plurality of respective piezoelectric sensors.

4. The fingerprint detection sensor of claim 3, wherein the fingerprint detection unit detects the fingerprint based on a difference between first acoustic impedance corresponding to valleys of the fingerprint and second acoustic impedance corresponding to ridges of the fingerprint.

5. The fingerprint detection sensor of claim 1, further comprising a polymer filler provided to surround the plurality of piezoelectric sensors.

6. The fingerprint detection sensor of claim 1, wherein the fingerprint detection unit detects a frequency change generated from the ultrasonic signals within the first region by the blood streams to determine whether the fingerprint is a forged fingerprint.

7. A method of detecting a fingerprint, the method comprising:
   discharging ultrasonic signals to a specific object from a plurality of piezoelectric sensors arranged on a two-dimensional plane in a matrix form;
   detecting reflected signals generated by reflecting the ultrasonic signals to the object within a first region on the two-dimensional plane in which the ultrasonic signals overlap one another;
   determining whether the object is a living body by using a difference in frequency between the ultrasonic signals and the reflected signals, the determining being performed by using the difference in frequency generated by blood streams within the object between the ultrasonic signals and the reflected signals; and
   detecting the reflected signals within a second region having an area larger than that of the first region when determining whether the object is a living body fails.

8. The method of claim 7, further comprising detecting a fingerprint of the object.

9. The method of claim 8, wherein in the detecting of the fingerprint, the fingerprint is detected based on a difference between first acoustic impedance corresponding to valleys of the fingerprint and second acoustic impedance corresponding to ridges of the fingerprint.

* * * * *